United States Patent
Kikkawa et al.

(10) Patent No.: US 8,531,707 B2
(45) Date of Patent: Sep. 10, 2013

(54) SYSTEMS AND METHODS FOR EXECUTING FORMS

(75) Inventors: Norifumi Kikkawa, Tokyo (JP); Yasunori Nagatomo, Tokyo (JP); Masahiro Hara, Tokyo (JP)

(73) Assignee: Sony Corporation, Tokyo (JP)

( * ) Notice: Subject to any disclaimer, the term of this patent is extended or adjusted under 35 U.S.C. 154(b) by 236 days.

(21) Appl. No.: 13/083,095

(22) Filed: Apr. 8, 2011

(65) Prior Publication Data

US 2011/0267648 A1 Nov. 3, 2011

(30) Foreign Application Priority Data

Apr. 30, 2010 (JP) ................................ P2010-105469

(51) Int. Cl.
*G06F 3/12* (2006.01)
*G06F 15/16* (2006.01)

(52) U.S. Cl.
USPC ......... 358/1.15; 358/1.13; 715/221; 709/203; 709/218; 709/219; 709/238

(58) Field of Classification Search
USPC ............... 358/1.15, 1.9, 1.13, 1.14; 715/221; 709/203, 218, 219, 238
See application file for complete search history.

(56) References Cited

U.S. PATENT DOCUMENTS

| | | | | |
|---|---|---|---|---|
| 6,144,990 A * | 11/2000 | Brandt et al. | ................. | 709/203 |
| 6,862,103 B1 * | 3/2005 | Miura et al. | ................. | 358/1.15 |
| 7,697,442 B2 * | 4/2010 | Fujisawa | ...................... | 370/241 |
| 7,911,631 B2 * | 3/2011 | Aoki et al. | .................... | 358/1.15 |
| 7,996,412 B2 * | 8/2011 | Bae et al. | ....................... | 707/754 |
| 8,004,703 B2 * | 8/2011 | Asami et al. | ................. | 358/1.15 |
| 8,006,176 B2 * | 8/2011 | Reddy et al. | .................... | 715/221 |
| 8,201,077 B2 * | 6/2012 | Reddy et al. | .................... | 715/221 |
| 2006/0251455 A1 * | 11/2006 | Kim et al. | ........................ | 400/62 |
| 2007/0130308 A1 * | 6/2007 | Kim et al. | ..................... | 709/223 |
| 2007/0250870 A1 * | 10/2007 | Kim et al. | ........................ | 725/81 |
| 2008/0046806 A1 * | 2/2008 | Reddy et al. | .................. | 715/221 |
| 2008/0126543 A1 * | 5/2008 | Hamada et al. | ............... | 709/225 |

FOREIGN PATENT DOCUMENTS

JP 2002-49613 2/2002

* cited by examiner

*Primary Examiner* — Tammy Pham
*Assistant Examiner* — Dennis Dicker
(74) *Attorney, Agent, or Firm* — Finnegan, Henderson, Farabow, Garrett & Dunner, L.L.P.

(57) ABSTRACT

Systems and methods for managing form data representing a form are disclosed. In one embodiment, an information-providing apparatus has a communication unit configured to communicate with an information-processing apparatus over a network, a storage unit storing a container, and a processing unit. The processing unit is configured to receive, via the communication unit, a request to access the container from the information-processing apparatus, to retrieve, from the container, form data representing a form, to send, via the communication unit, the form data to the information-processing apparatus, and to receive, via the communication unit, a form execution request from the information-processing apparatus, the form execution request including an identification of the container and user-supplied information added to the form date. The processing unit is further configured to execute the form execution request based on the identification of the container and on the user-supplied information.

12 Claims, 8 Drawing Sheets

SYSTEMS AND METHODS FOR EXECUTING FORMS

PRIORITY APPLICATION

The present application claims the benefit of priority to Japanese Patent Application JP 2010-105469 filed in the Japan Patent Office on Apr. 30, 2010, which is expressly incorporated by reference in its entirety.

BACKGROUND

1. Technical Field

The present disclosure relates to an information processing apparatus, an information processing method, a program, an information providing apparatus, and an information processing system.

2. Description of the Related Art

Client/server systems are used in various scenes recently. In the client/server system, roles played by computers are shared by a client (which may be hereinafter referred to as "information processing apparatus") and a server (which may be hereinafter referred to as "information providing apparatus"). In the client/server, a user usually inputs a desired instruction to a client while viewing a screen, and the client transmits a request to a server according to the instruction input by the user. The server receives the request transmitted from the client, executes operation according to the request, and replies a result obtained by executing the operation to the client as a response to the request.

Various kinds of information are transmitted and received between the client and the server. For example, when the server transmits a form stored therein to the client, the client receives information (which may be hereinafter referred to as "input information") input by a user to an input field in the form, and transmits the input information to the server. Subsequently, the client receives the result obtained by executing the form from the server. For example, such handling of the form is also applied to a Web server and a Web client connected to the Internet (for example, see Japanese Patent Application Laid-Open No. 2002-049613).

SUMMARY

In the above handling of the form, however, the server only replies, to the client, the result obtained by executing the form based on the input information, regardless of the state of the client. In other words, there is an issue in that it is difficult to change the state of the client after execution of the form, according to the state of the client during execution of the form. For example, the state of the client means a folder on the server which the client is viewing.

Accordingly, the present disclosure provides a novel and improved technique for changing the state of the client after execution of the form, according to the state of the client during execution of the form.

One aspect of the disclosure relates to an information-providing apparatus for managing form data representing a form. The apparatus may include a communication unit configured to communicate with an information-processing apparatus over a network, a storage unit storing a container, and a processing unit. The processing unit may be configured to receive, via the communication unit, a request to access the container from the information-processing apparatus, to retrieve, from the container, form data representing a form, to send, via the communication unit, the form data to the information-processing apparatus, and to receive, via the communication unit, a form execution request from the information-processing apparatus, the form execution request including an identification of the container and user-supplied information added to the form data. The processing unit may be further configured to execute the form execution request based on the identification of the container and on the user-supplied information.

Another aspect relates to a computer-implemented method for managing form data representing a form. Consistent with the disclosed embodiments, the method may include receiving, from an information-processing apparatus over a network, a request to access a container stored at an information-providing apparatus, retrieving, from the container, form data representing a form, sending the form data to the information-processing apparatus over the network, and receiving, from the information-processing apparatus over the network, a form execution request with an identification of the container and user-supplied information added to the form data. The method may further include executing the form request based on the identification of the container and on the user-supplied information.

Another aspect relates to a non-transitory computer-readable storage medium storing instructions which, when executed by an information-providing apparatus, cause the information-providing apparatus to perform a method for managing form data representing a form. The method may include receiving, from an information-processing apparatus over a network, a request to access a container stored at an information-providing apparatus, retrieving, from the container, form data representing a form, sending the form data to the information-processing apparatus over the network, and receiving, from the information-processing apparatus over the network, a form execution request with an identification of the container and user-supplied information added to the form data. The method may further include executing the form request based on the identification of the container and on the user-supplied information.

Another aspect relates to an information-processing apparatus for sending a form execution request. The information-processing apparatus may include a communication unit configured to communicate with an information-providing apparatus over a network, an input unit configured to receive input from a user of the information-processing apparatus, and a processing unit. The processing unit may be configured to receive, via the input unit, user input indicative of a request to access a container stored at the information-providing apparatus, to send, via the communication unit, the request to access the container to the information-providing apparatus, to receive, via the communication unit from the information-providing apparatus, form data representing a form contained in the container, to receive, via the input unit, user-supplied information added to the form data, to send, via the communication unit to the information-providing apparatus, a form execution request including an identification of the container and the user-supplied information, and to receive, via the communication unit, a result of executing the form execution request based on the identification of the container and on the user-supplied information.

Another aspect relates to a computer-implemented method for sending a form execution request. The method may include receiving, at an information processing apparatus, input from a user indicative of a request to access a container stored at an information-providing apparatus, sending the request to access the container to the information-providing apparatus over a network, receiving, from the information-providing apparatus, form data representing a form contained in the container, receiving user-supplied information added to the form data, sending, to the information-providing apparatus, a form execution request including an identification of the container and the user-supplied information, receiving a result of executing the form execution request based on the identification of the container and on the user-supplied information.

Finally, another aspect relates to a non-transitory computer-readable storage medium storing instructions which, when executed by an information-processing apparatus, cause the information-processing apparatus to perform a method for sending a form execution request. The method may include receiving, at an information processing apparatus, input from a user indicative of a request to access a container stored at an information-providing apparatus, sending the request to access the container to the information-providing apparatus over a network, receiving, from the information-providing apparatus, form data representing a form contained in the container, receiving user-supplied information added to the form data, sending, to the information-providing apparatus, a form execution request including an identification of the container and the user-supplied information, receiving a result of executing the form execution request based on the identification of the container and on the user-supplied information.

As described above, according to the present disclosure, the state of the client after execution of the form can be changed according to the state of the client during execution of the form.

DETAILED DESCRIPTION OF THE EMBODIMENTS

Hereinafter, embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The "Detailed Description of the Embodiment" will be explained in the order listed below.

1. Embodiment
  1-1. Configuration of information processing system
  1-2. Hierarchy structure managed by information providing apparatus
  1-3. Example of screen transition in a case of selecting each container constituting hierarchy structure
  1-4. Functional configuration of information providing apparatus
  1-5. Functional configuration of information processing apparatus
  1-6. Flow of processing executed by information processing apparatus
  1-7. Flow of processing executed by information providing apparatus
  1-8. Flow of processing executed by information processing system
2. Modification
3. Conclusion

1. EMBODIMENT

[1-1. Configuration of Information Processing System]

Figure 1:
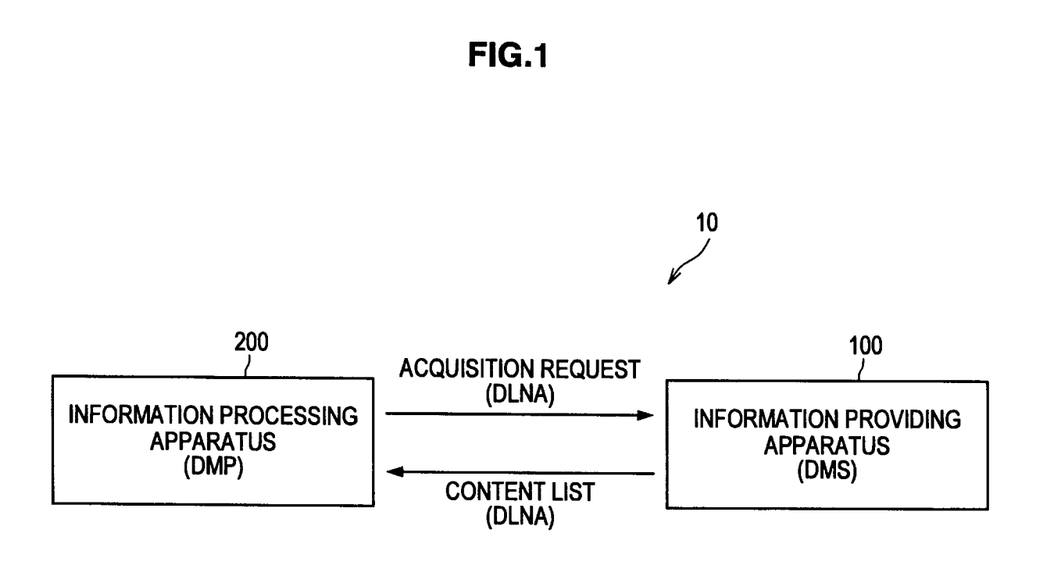
FIG. 1 is a figure illustrating a configuration of an information processing system according to the present embodiment.

FIG. 1 is a figure illustrating a configuration of an information processing system according to the present embodiment. As shown in FIG. 1, an information processing system 10 includes an information providing apparatus 100 and an information processing apparatus 200. For example, the information providing apparatus 100 and the information processing apparatus 200 are in the same home network. For example, the information providing apparatus 100 functions as a DMS (Digital Media Server). For example, the information processing apparatus 200 functions as a DMP (Digital Media Player). In other words, the information processing apparatus 200 obtains contents and a content list from the information providing apparatus 100 according to DLNA (Digital Living Network Alliance).

Examples of content types include music data, video data, and text data. However, the content types are not limited thereto. The content list is not a content itself. The content list is a list of data relating to contents. Examples of data relating to contents include the name of a content, information representing the content, and the name of a person related to the content. However, the data relating to contents are not limited thereto.

In order to obtain a content list from the information providing apparatus 100, the information processing apparatus 200 transmits, for example, an acquisition request to the information providing apparatus 100, and receives the content list from the information providing apparatus 100, which is transmitted in response to the acquisition request. The information processing apparatus 200 obtains a content selected by a user from the content list from the information providing apparatus 100.

For example, when the information providing apparatus 100 transmits a form stored therein to the information processing apparatus 200, the information processing apparatus 200 receives input information given by a user, and transmits the input information to the information providing apparatus 100. Subsequently, the information processing apparatus 200 receives a result obtained by executing the form based on the input information from the information providing apparatus 100. For example, such handling of the form is also applied to a Web server and a Web client connected to the Internet. The form includes an input field for setting input information used during execution of a certain processing.

In the above handling of the form in general, for example, the server usually replies, to the client, the result obtained by executing the form based on the input information, regardless of the state of the client. In other words, it is difficult to change the state of the client after execution of the form, according to the state of the client during execution of the form. In this specification, a technique will be explained in detail, in which the information providing apparatus 100 changes the state of the information processing apparatus 200 after execution of the form, according to the state of the information processing apparatus 200 during execution of the form.

[1-2. Hierarchy Structure Managed by Information Providing Apparatus]

Figure 2:
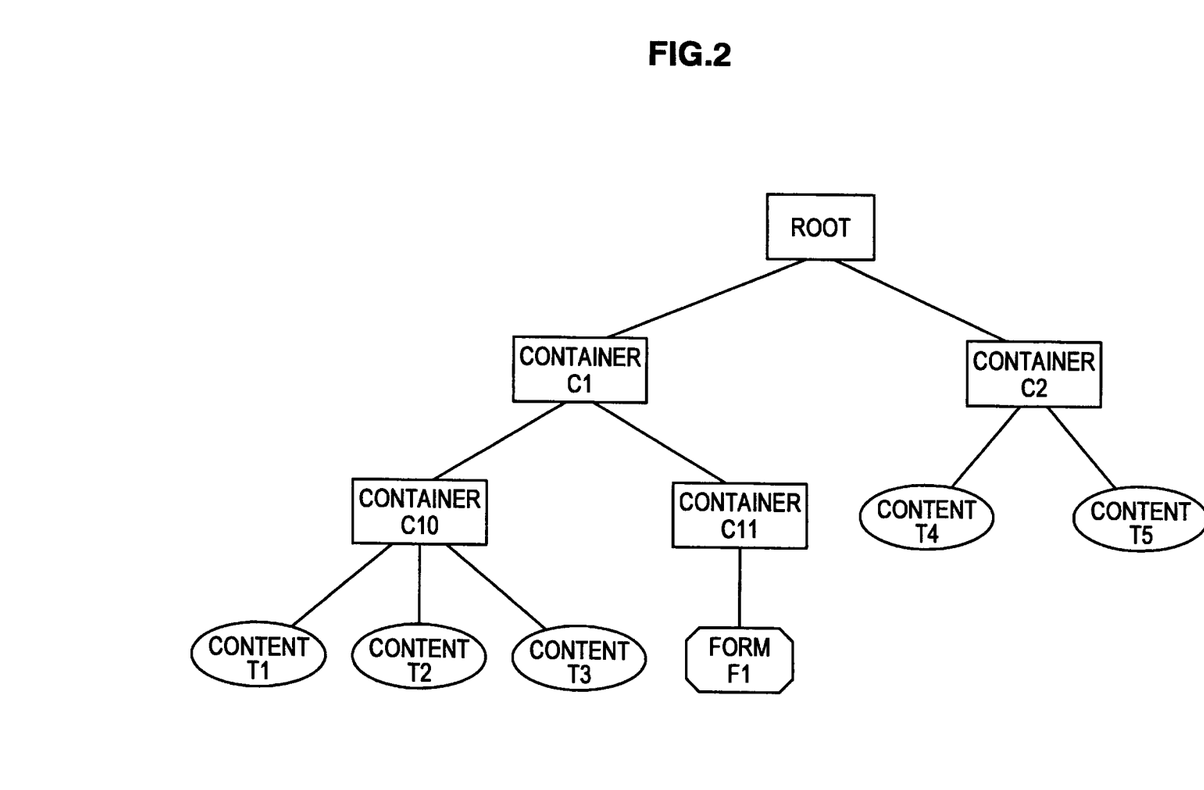
FIG. 2 is a figure illustrating a hierarchy structure managed by an information providing apparatus according to the present embodiment.

FIG. 2 is a figure illustrating a hierarchy structure managed by the information providing apparatus according to the present embodiment. As shown in FIG. 2, the information providing apparatus 100 has a hierarchy structure in which containers are structured in a hierarchical manner, and each container includes containers and contents therein. The container may also be referred to as a folder. For example, when the information processing apparatus 200 uses an acquisition request to specify a container, the information processing apparatus 200 can obtain a list of containers residing immediately under the specified container and contents residing immediately under the specified container from the information providing apparatus 100.

In the present embodiment, the container may include not only containers and contents but also forms therein. In the example as shown in FIG. 2, a form F1 resides immediately under a container C11. For example, when the information processing apparatus 200 uses an acquisition request to specify the container C11, the information processing apparatus 200 can obtain the form F1 residing immediately under the specified container C11 from the information providing apparatus 100. For example, during execution of the form F1, the information processing apparatus 200 selects a container C. In the present embodiment, for example, the information providing apparatus 100 changes the state of the information processing apparatus 200 after execution of the form, based on the container selected by the information processing apparatus 200 during execution of the form. In the explanation below, containers, contents, forms, and the like are collectively referred to as objects.

[1-3. Example of Screen Transition in a Case of Selecting Each Container Constituting Hierarchy Structure]

Figure 3:
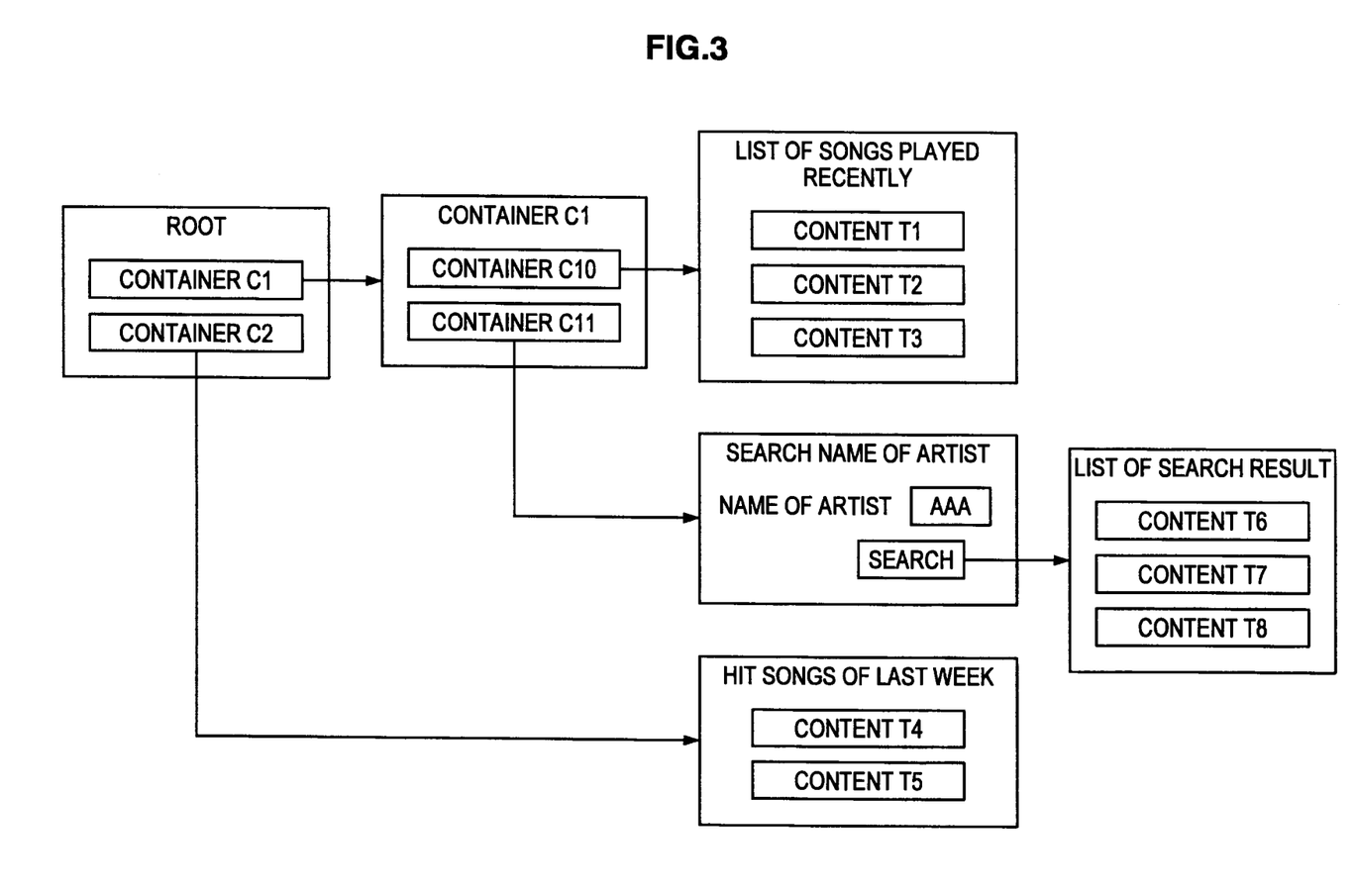
FIG. 3 is a figure illustrating an example of screen transition in a case of selecting each container constituting the hierarchy structure managed by the information providing apparatus according to the present embodiment.

FIG. 3 is a figure illustrating an example of screen transition in a case of selecting each container constituting the hierarchy structure managed by the information providing apparatus according to the present embodiment. As described above, when the information processing apparatus 200 uses an acquisition request to specify a container, the information processing apparatus 200 can obtain a list of containers residing immediately under the specified container, contents residing immediately under the specified container, and forms residing immediately under the specified container. FIG. 3 particularly shows an example of display of objects residing immediately under the container selected by the information processing apparatus 200 and transition of the container selected by the information processing apparatus 200 in a case where the information providing apparatus 100 has the hierarchy structure as shown in FIG. 2. More particularly, FIG. 3 shows arrows extending from the container selected by the information processing apparatus 200 to objects residing immediately under the selected container, which are displayed.

"ROOT", "container C1", "list of songs played recently", "search by the name of artist", and "hit songs of last week" are examples of screens displayed by the information processing apparatus 200 upon selecting ROOT, container C1, container C10, container C11, and container C2, respectively, as shown in FIG. 2. "List of search result" is an example of a screen displayed after execution of the form F1 as shown in FIG. 2 is executed.

The names such as "ROOT", "container C1", "list of songs played recently", "search by the name of artist", "hit songs of last week", and "list of search result" represent the names of the containers selected by the information processing apparatus 200. "Container C11" and "content T1" are names of objects residing immediately under the selected container. A text box for inputting "the name of artist", a "search" button, and the like are components constituting a form residing immediately under the selected container. The information processing apparatus 200 can obtain these names and components from the information providing apparatus 100 as a response to an acquisition request.

In the explanation below, for example, various kinds of information included in a request and a response are set by a transmission source at a predetermined position in the request and the response defined for respective types of information, and are obtained by a transmission destination from the predetermined position.

[1-4. Functional Configuration of Information Providing Apparatus]

Figure 4:
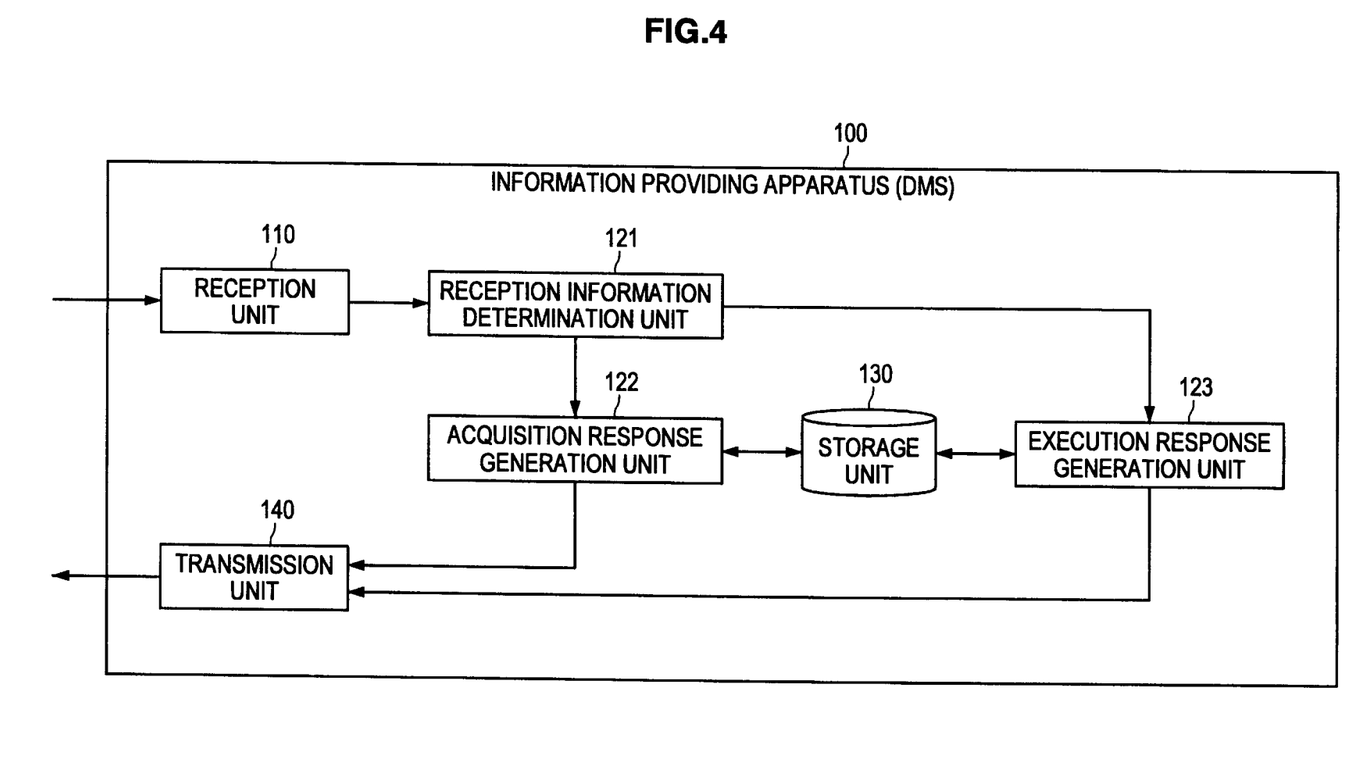
FIG. 4 is a figure illustrating a functional configuration of the information providing apparatus according to the present embodiment.

FIG. 4 is a figure illustrating a functional configuration of the information providing apparatus according to the present embodiment. The information providing apparatus 100 includes at least a reception unit 110, an acquisition response generation unit 122, a transmission unit 140, and an execution response generation unit 123.

The reception unit 110 has a function of receiving, from the information processing apparatus 200, an acquisition request, i.e., request including container identification information (hereinafter referred to as "folder ID") for identifying a container in the hierarchy structure of the information providing apparatus 100. The format of the acquisition request is not particularly limited. For example, the reception unit 110 is constituted by a communication device, and functions as a communication interface with the information providing apparatus 100.

The acquisition response generation unit 122 has a function of generating an acquisition response, i.e., a response including objects residing immediately under a container identified by a folder ID included in an acquisition request received by the reception unit 110, as a response to the acquisition request. The format of the acquisition response is not particularly limited. For example, when the container identified by the folder ID included in the acquisition request received by the reception unit 110 is the container C11, the acquisition response generation unit 122 generates an acquisition response, i.e., a response including the form F1 residing immediately under the container C11.

For example, the format of the acquisition response may be a format of error response of SOAP (Simple Object Access Protocol). In this case, for example, the form may be included in errorDescription of the error response of the SOAP.

The transmission unit 140 has a function of transmitting an acquisition response generated by the acquisition response generation unit 122 to the information processing apparatus 200. For example, the transmission unit 140 is constituted by a communication device, and functions as a communication interface with the information providing apparatus 100.

The reception unit 110 further receives an execution request from the information processing apparatus 200. The execution request is a request including input information, i.e., information input to the form by the information processing apparatus 200. The format of the execution request is not particularly limited. In the example as shown in FIG. 3, the input information "AAA" is input to "the name of artist" in the form F1 by the information processing apparatus 200, and the reception unit 110 receives an execution request, i.e., a request including the input information "AAA" from the information processing apparatus 200.

The execution response generation unit 123 has a function of generating an execution response, i.e., a response including operation information. The operation information is information corresponding to the folder ID included in the acquisition request received by the reception unit 110. For example, the acquisition request, in response to which the form F1 included in the execution response is transmitted to the information processing apparatus 200, is considered to include the folder ID for identifying the container C11.

Accordingly, for example, the acquisition response generation unit 122 may cause a storage unit 130 to store the folder ID included in the acquisition request, in response to which the execution response including the form is transmitted, and apparatus identification information attached to the acquisition request for identifying the information processing apparatus 200 having transmitted the request. The storage unit 130 stores the folder ID and the apparatus identification information in such a manner that the folder ID and the apparatus identification information are associated with each other. Then, when the execution request is obtained from the information processing apparatus 200 identified by the apparatus identification information via the reception unit 110, the acquisition response generation unit 122 may obtain the apparatus identification information attached to the execution request for identifying the information processing apparatus 200 having transmitted the request, and may obtain the folder ID corresponding to the obtained apparatus identification information from the storage unit 130. Then, the acquisition response generation unit 122 may generate an execution response including operation information corresponding to the obtained folder ID. For example, the storage unit 130 is constituted by a storage device such as an HDD (Hard Disk Drive) and a semiconductor memory.

After processing based on input information is executed, the transmission unit 140 transmits the execution response generated by the execution response generation unit 123 to the information processing apparatus 200. The processing based on the input information may be executed by the information providing apparatus 100, or may be executed by an apparatus other than the information providing apparatus 100.

As described above, the information providing apparatus 100 can decide operation of the information processing apparatus 200 after execution of the form, based on the state of the information processing apparatus 200 during execution of the form. The state of the information processing apparatus 200 may be, for example, a container selected by the information processing apparatus 200. For example, the information providing apparatus 100 makes an execution response of the form F1 including operation information, i.e., information attached with a folder ID for identifying "container X" and representing "change of selected container" (in the example of FIG. 8, this corresponds to "jump"), and transmits this execution response to the information processing apparatus 200. Accordingly, the state of the information processing apparatus 200 after execution of the form F1 can be changed to the state in which the container X is selected. For example, this is achieved when the information processing apparatus 200 executes processing for transmitting an acquisition request including a folder ID attached to operation information to the information providing apparatus 100 and processing for receiving an acquisition request including an object residing immediately under the container identified by the folder ID from the information providing apparatus 100, as a command corresponding to operation information included in an execution response.

Information attached to operation information may be not only a folder ID of an already existing container but also a search text for searching a content. In this case, the information providing apparatus 100 receives the acquisition request including the operation information included in the execution response from the information processing apparatus 200. Then, the information providing apparatus 100 generates an acquisition response including a content list obtained by searching a search text attached to the operation information, and transmits the acquisition response to the information processing apparatus 200 in response to the acquisition request. In the example as shown in FIG. 3, the content list (contents T6, T7, T8) obtained by searching the search text "Search:AAA" is transmitted from the information providing apparatus 100 to the information processing apparatus 200. The folder ID and the search text are examples of predetermined conditions attached to the operation information.

Other than the above, for example, the information providing apparatus 100 may generate a form execution response including information indicating "confirm password" (for example, "password") as operation information, and transmit this execution response to the information processing apparatus 200. In this case, the state of the information processing apparatus 200 after execution of the form can be changed to the state for displaying a password input screen and waiting for input of a password. For example, this may be achieved when the information processing apparatus 200 executes processing for displaying the password input screen as a command corresponding to operation information included in an execution response.

For example, the information providing apparatus 100 may generate a form execution response including information indicating information indicating "reproduction of content" (for example, "play") attached with a content ID for identifying "content T6", and may transmit the execution response to the information processing apparatus 200. In this case, the state of the information processing apparatus 200 after execution of the form can be changed to the state for reproducing the content. For example, this may be achieved when the information processing apparatus 200 executes processing for transmitting a content acquisition request including a content ID attached to operation information to the information providing apparatus 100 and processing for receiving the content identified by the content ID from the information providing apparatus 100, as a command corresponding to operation information included in an execution response.

When a request further including predetermined information included in the form is received as an execution request, the transmission unit 140 may execute processing based on input information and the predetermined information, and may thereafter transmit an execution response to the information processing apparatus 200. For example, the predetermined information is information for identifying processing executed based on input information, and may be represented with, for example, a URL (Uniform Resource Locator). When a URL is used as the predetermined information, a form is executed by a resource specified by the URL. In this case, commonality is achieved between a GET command used to execute a form on a generally-available browser and an execution request according to the present embodiment, and this facilitates the implementation of the information providing apparatus 100 for processing both of the GET command and the execution request.

For example, a URL may be generated by combining "http://", "IP (Internet Protocol) address of a server executing processing based on input information", and "any text string" in this order. For example, the URL may include an action tag of a form. For example, in the example as shown in FIG. 3, the form F1 includes, as predetermined information, a URL representing a resource for executing "search". For example, when the information processing apparatus 200 selects the URL indicating the resource for executing this "search", an execution request including this URL is received from the information processing apparatus 200.

The information providing apparatus 100 may further includes the storage unit 130 for storing correspondence information including operation information and a folder ID which are associated with each other. In this case, the execution response generation unit 123 obtains operation information corresponding to a folder ID included in an acquisition request received by the reception unit 110 from the correspondence information stored in the storage unit 130, and generates a response including the obtained operation information as an execution response.

The acquisition response generation unit 122 may determine whether processing performed upon receiving an acquisition response including a form can be normally performed by the information processing apparatus 200 or not. In this case, when the acquisition response generation unit 122 determines that processing performed upon receiving an acquisition response including a form can be normally performed by the information processing apparatus 200, the transmission unit 140 may transmit the acquisition response including the form to the information processing apparatus 200.

On the other hand, when the acquisition response generation unit 122 determines that processing performed upon receiving the acquisition response including the form may not be normally performed by the information processing apparatus 200, the transmission unit 140 may transmit, instead of the acquisition response including the form, a response indicating that there is no object immediately under the container identified by the folder ID included in the acquisition request to the information processing apparatus 200 as an acquisition response.

There are many methods for the acquisition response generation unit 122 to determine whether processing performed upon receiving the acquisition response including the form can be normally performed by the information processing apparatus 200 or not. For example, the acquisition response generation unit 122 determines whether processing performed upon receiving the acquisition response including the form can be normally performed by the information processing apparatus 200 or not, based on the type of the information processing apparatus 200 included in the acquisition request received by the reception unit 110.

For example, the type of the information processing apparatus 200 may be included in an acquisition request by the information processing apparatus 200. For example, when the information providing apparatus 100 provides a CDS (Content Directory Service), and the information processing apparatus 200 uses Browse command as an acquisition request, a filter argument of Browse command can be used as the type of the information processing apparatus 200. When Search command is used as an acquisition request, the information processing apparatus 200 can also use the filter argument as the type of the information processing apparatus 200 in the same manner as the case where Browse command is used. In the explanation below, Browse command is mainly used as an acquisition request, for example.

The filter argument is an argument used to limit a content list which is to be obtained from among content lists that can be provided by a service providing apparatus, not shown, providing contents list to the information providing apparatus 100. For example, the information processing apparatus 200 capable of using the service provided by a service providing apparatus, not shown, may use a method in which the filter argument of Browse command needs setting of information for identifying the type of the service provided by the service providing apparatus, not shown. This is because which of an acquisition response including a form and an acquisition response not including a form is provided by the service providing apparatus, not shown, is considered to be determined according to the type of the service provided by the service providing apparatus, not shown.

An example of a type of a service for providing a content to a television set via the Internet by the server includes BIVL (Bravia Internet Video Link). BIVL is an example of service for providing an acquisition response including a form to the information processing apparatus 200 by the service providing apparatus, not shown. In a case where the service providing apparatus, not shown, corresponds to the server, and the information processing apparatus 200 corresponds to a television set for using BIVL service provided by the server, the information processing apparatus 200 may use a method in which a value indicating availability of BIVL is set to the filter argument of Browse command. The value indicating availability of BIVL may use, for example "av:BIVL" and the like.

There may be a possibility that a value not recognized by the information providing apparatus 100 is set to the filter argument. Even in such case, the information providing apparatus 100 may disregard the value not recognized by the information providing apparatus 100, for example. As described above, the method for using the filter argument of the command as the type of the information processing apparatus 200 can be employed only by applying improvement in the level of application. Therefore, there is an advantage in that the method can be easily improved.

The information providing apparatus 100 may include a reception information determination unit 121. The reception information determination unit 121 has a function of determining information received by the reception unit 110. For example, when information received by the reception unit 110 includes information for identifying an acquisition request, the reception information determination unit 121 determines that the information received by the reception unit 110 is an acquisition request, and outputs the request to the acquisition response generation unit 122. For example, when information received by the reception unit 110 includes information for identifying an execution request, the reception information determination unit 121 determines that the information received by the reception unit 110 is an execution request, and outputs the request to the execution response generation unit 123.

Each of the reception information determination unit 121, the acquisition response generation unit 122, and the execution response generation unit 123 is constituted by, for example, a CPU (Central Processing Unit), a RAM (Random Access Memory), and the like. The functions of the reception information determination unit 121, the acquisition response generation unit 122, and the execution response generation unit 123 are achieved by causing the CPU to extract a program stored in the storage unit 130 (or other non-transitory computer-readable storage medium) to a RAM and execute the program. However, the configuration is not limited thereto. Some of the reception information determination unit 121, the acquisition response generation unit 122, and the execution response generation unit 123 may be made with dedicated hardware. The storage unit 130 may further store various kinds of data used when the CPU executes the programs.

[1-5. Functional Configuration of Information Processing Apparatus]

Figure 5:
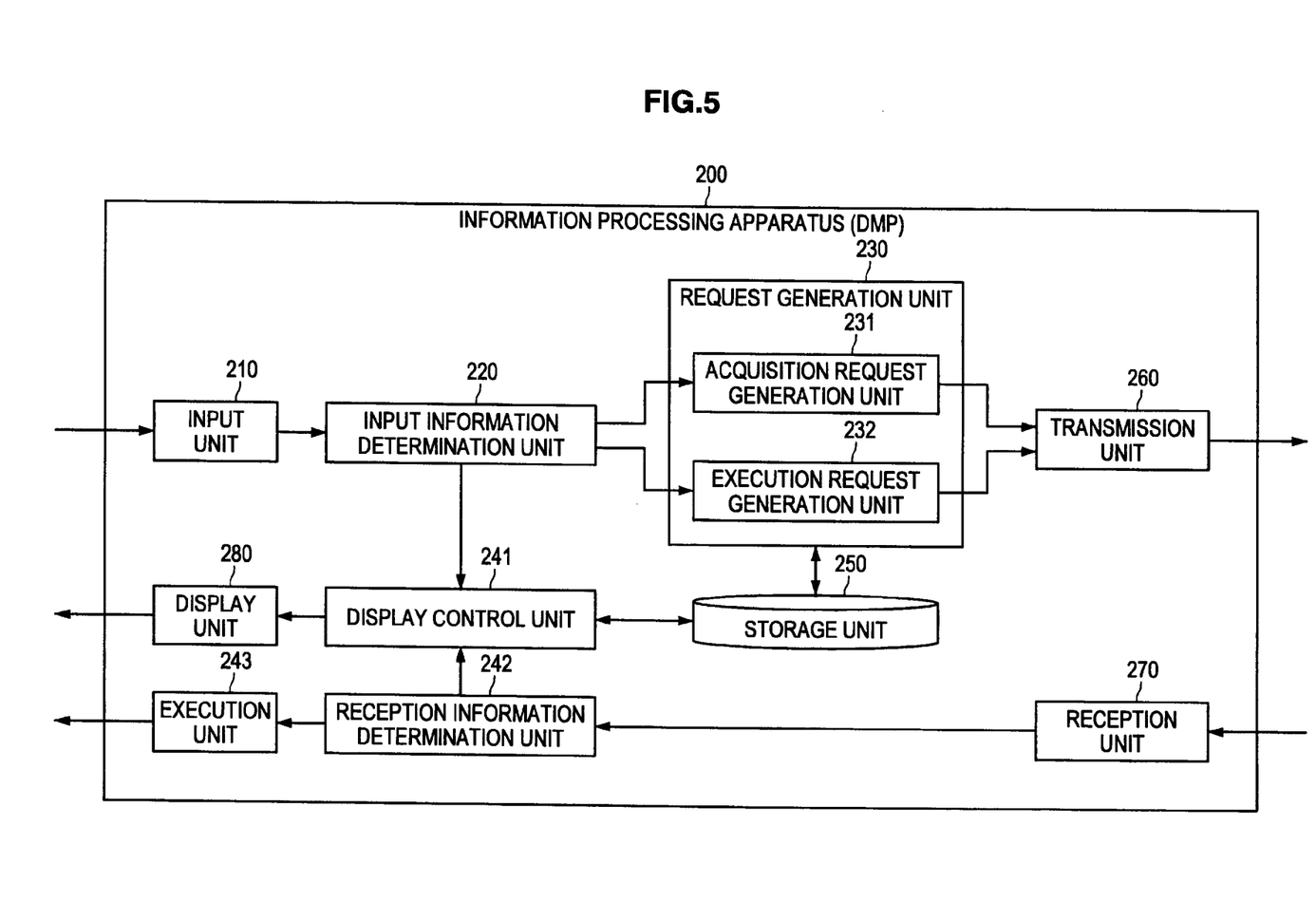
FIG. 5 is a figure illustrating a functional configuration of an information processing apparatus according to the present embodiment.

FIG. 5 is a figure illustrating a functional configuration of an information processing apparatus according to the present embodiment. The information processing apparatus 200 includes at least an acquisition request generation unit 231, a transmission unit 260, a reception unit 270, an execution request generation unit 232, and an execution unit 243.

The acquisition request generation unit 231 has a function of generating an acquisition request, i.e., a request including a folder ID for identifying a container managed by the information providing apparatus 100. For example, the acquisition request generation unit 231 generates an acquisition request including a folder ID for identifying the container C11. The folder ID included in the acquisition request by the acquisition request generation unit 231 is input from, for example, the input information determining unit 220.

The transmission unit 260 has a function of transmitting the acquisition request generated by the acquisition request generation unit 231 to the information providing apparatus 100. For example, the transmission unit 260 is constituted by a communication device, and functions as a communication interface with the information providing apparatus 100.

The reception unit 270 has a function of receiving an acquisition response, i.e., a response including forms residing immediately under a container identified by a folder ID, as a response to the acquisition request, from the information providing apparatus 100. For example, when the transmission unit 260 transmits an acquisition request including the folder ID for identifying the container C11, the reception unit 270 receives, from the information providing apparatus 100, an acquisition response including the form F1 residing immediately under the container C11 as a response thereto. For example, the reception unit 270 is constituted by a communication device, and functions as a communication interface with the information providing apparatus 100.

The transmission unit 260 has a function of further transmitting an execution request to the information providing apparatus 100. The reception unit 270 has a function of receiving, from the information providing apparatus 100, an execution response including operation information, i.e., information corresponding to a folder ID included in an acquisition request as a response to the execution request after processing based on input information is executed.

The execution unit 243 has a function of executing a command corresponding to operation information included in the execution response received by the reception unit 270. For example, the execution unit 243 executes, as a command corresponding to operation information, processing for causing the acquisition request generation unit 231 to generate an acquisition request including a predetermined condition attached to operation information, processing for causing the transmission unit 260 to transmit the acquisition request to the information providing apparatus 100, and processing for causing the reception unit 270 to receive, from the information providing apparatus 100, an acquisition response, i.e., a response including objects satisfying a predetermined condition as a response to the acquisition request. As described above, the folder ID and the search text are examples of predetermined conditions attached to the operation information.

The execution request generation unit 232 can also generate a response further including predetermined information included in the form, as an execution request. For example, the predetermined information is information for identifying processing executed based on input information, and may be represented with, for example, a URL.

The information processing apparatus 200 may further include an input unit 210 for receiving selection information, i.e., information for selecting predetermined information. For example, in the example as shown in FIG. 3, the input unit 210 receives information indicating execution of "search". The input unit 210 receives not only selection information but also various kinds of information from a user. For example, the input unit 210 is constituted by an input device such as a keyboard and a mouse. In a case where the information processing apparatus 200 includes the input unit 210, the execution request generation unit 232 may generate an execution request, i.e., a request including input information and predetermined information selected by the selection information received by the input unit 210.

The input unit 210 may further receive input information given by a user to a form. In the example as shown in FIG. 3, the input unit 210 can receive input information "AAA" given to the form F1. When the input unit 210 receives input information, the execution request generation unit 232 can generate an execution request, i.e., a request including input information received by the input unit 210 and predetermined information selected by selection information.

The information processing apparatus 200 may further include a storage unit 250 for storing correspondence information including operation information and a command. which are associated with each other. In this case, the execution unit 243 obtains a command corresponding to operation information received by the reception unit 270 from the correspondence information stored in the storage unit 250, and executes the command. For example, when information indicating "change of a selected container" is adopted as operation information, and processing for transmitting an acquisition request including a folder ID attached to the operation information to the information providing apparatus 100 and processing for receiving an acquisition response including an object residing immediately under the container identified by the folder ID from the information providing apparatus 100 are adopted as a command, the storage unit 250 can store correspondence information including this operation information and this command which are associated with each other. For example, the storage unit 250 is constituted by a storage device such as an HDD and a semiconductor memory.

The information processing apparatus 200 may further include a display control unit 241. The display control unit 241 has a function of causing a display unit 280 to display objects included in an acquisition response received by the reception unit 270 from the information providing apparatus 100. In the example as shown in FIG. 3, the display control unit 241 causes the display unit 280 to display a screen including objects residing immediately under the selected container. In this example, the display unit 280 is considered to reside in the information processing apparatus 200. Alternatively, the display unit 280 may reside outside of the information processing apparatus 200. The display unit 280 has a function of displaying a screen including objects residing immediately under the container selected under the control of the display control unit 241. The display unit 280 is constituted by, for example, a display device.

When the input information determining unit 220 determines that information input by a user via the input unit 210 is information for selecting a container, the input information determining unit 220 has a function of selecting a container from among the objects included in the acquisition response based on the information. When a container is selected from among the objects included in the acquisition response, the input information determining unit 220 outputs a folder ID for identifying the selected container to the acquisition request generation unit 231. Further, when the information input from a user via the input unit 210 is determined to be input information given to a form, the input information determining unit 220 outputs the input information to the execution request generation unit 232.

The information processing apparatus 200 may further include a reception information determination unit 242. The reception information determination unit 242 has a function of determining information received by the reception unit 270. For example, when the information received by the reception unit 270 includes information for identifying an acquisition response, the reception information determination unit 242 determines that the information received by the reception unit 270 is an acquisition response, and outputs the response to the display control unit 241. For example, when the information received by the reception unit 270 includes information for identifying an execution response, the reception information determination unit 242 determines that the information received by the reception unit 270 is an execution response, and outputs the response to the execution unit 243.

Each of the request generation unit 230 including the acquisition request generation unit 231 and the execution request generation unit 232, the input information determining unit 220, the display control unit 241, and the reception information determination unit 242 is constituted by, for example, a CPU, a RAM, and the like. The functions of the request generation unit 230 including the acquisition request generation unit 231 and the execution request generation unit 232, the input information determining unit 220, the display control unit 241, and the reception information determination unit 242 are achieved when the CPU extracts a program stored in the storage unit 250 (or other non-transitory computer-readable storage medium) to a RAM and executes the program. However, the configuration is not limited thereto. Some of the request generation unit 230, the input information determining unit 220, the display control unit 241, and the reception information determination unit 242 may be made with dedicated hardware. The storage unit 250 may further store various kinds of data used when the CPU executes the program.

[1-6. Flow of Processing Executed by Information Providing Apparatus]

Figure 6:
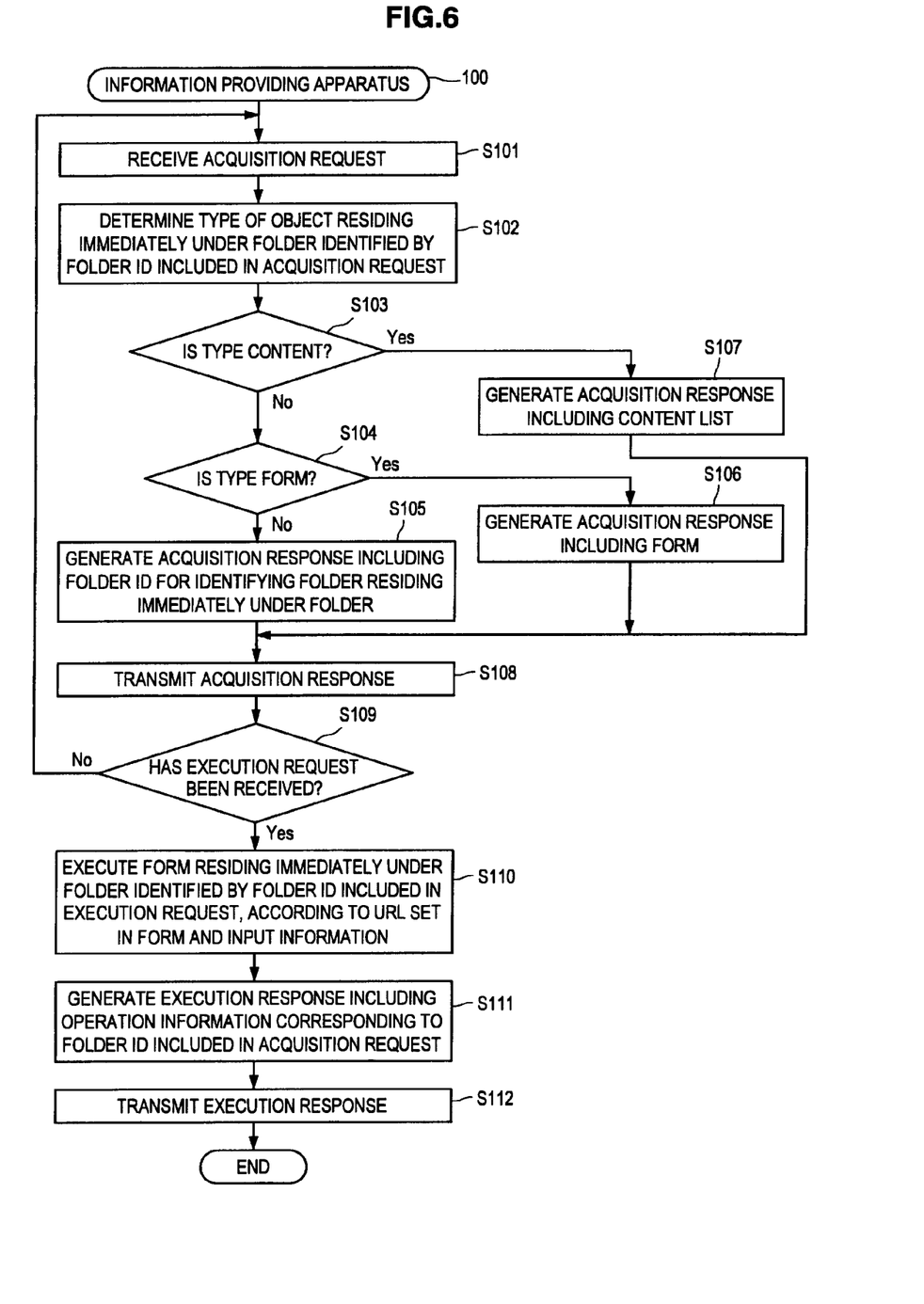
FIG. 6 is a flowchart illustrating a flow of processing executed by the information providing apparatus according to the present embodiment.

FIG. 6 is a flowchart illustrating a flow of processing executed by the information providing apparatus according to the present embodiment. The flowchart as shown in FIG. 6 shows an example of processing executed by the information providing apparatus 100. However, the processing executed by the information providing apparatus 100 is not limited to the processing as shown in this flowchart.

First, the reception unit 110 of the information providing apparatus 100 receives an acquisition request from the information processing apparatus 200 (step S101). Subsequently, when the type of the object residing immediately under the folder identified by the folder ID included in the acquisition request is a content ("Yes" in step S103), the acquisition response generation unit 122 generates an acquisition response including a content list (step S107), and step S108 is subsequently performed.

When the type of the object is not a content ("No" in step S103) but is a form ("Yes" in step S104), the acquisition response generation unit 122 generates an acquisition response including a form (step S106), and step S108 is subsequently performed.

When the type of the object is not a content ("No" in step S103) and is not a form ("No" in step S104), the acquisition response generation unit 122 determines that the type of the object is a folder. Accordingly, the acquisition response generation unit 122 generates an acquisition response including a folder ID for identifying a folder residing immediately under the folder identified by the folder ID included in the acquisition request (step S105), and step S108 is subsequently performed.

Subsequently, the transmission unit 140 transmits the acquisition response generated by the acquisition response generation unit 122 to the information processing apparatus 200 (step S108). Subsequently, when the reception unit 110 does not receive an execution request ("No" in step S109), the reception unit 110 returns back to step S101. When an execution request is received ("Yes" in step S109), step S110 is subsequently performed.

The execution response generation unit 123 executes the form residing immediately under the folder identified by the folder ID included in the execution request, according to the URL set in the form and the input information (step S110). Subsequently, the execution response generation unit 123 generates an execution response including operation information corresponding to a folder ID included in the acquisition request (step S111), and the transmission unit 140 transmits the execution response to the information processing apparatus 200 (step S112), and processing is terminated.

[1-7. Flow of Processing Executed by Information Processing Apparatus]

Figure 7:
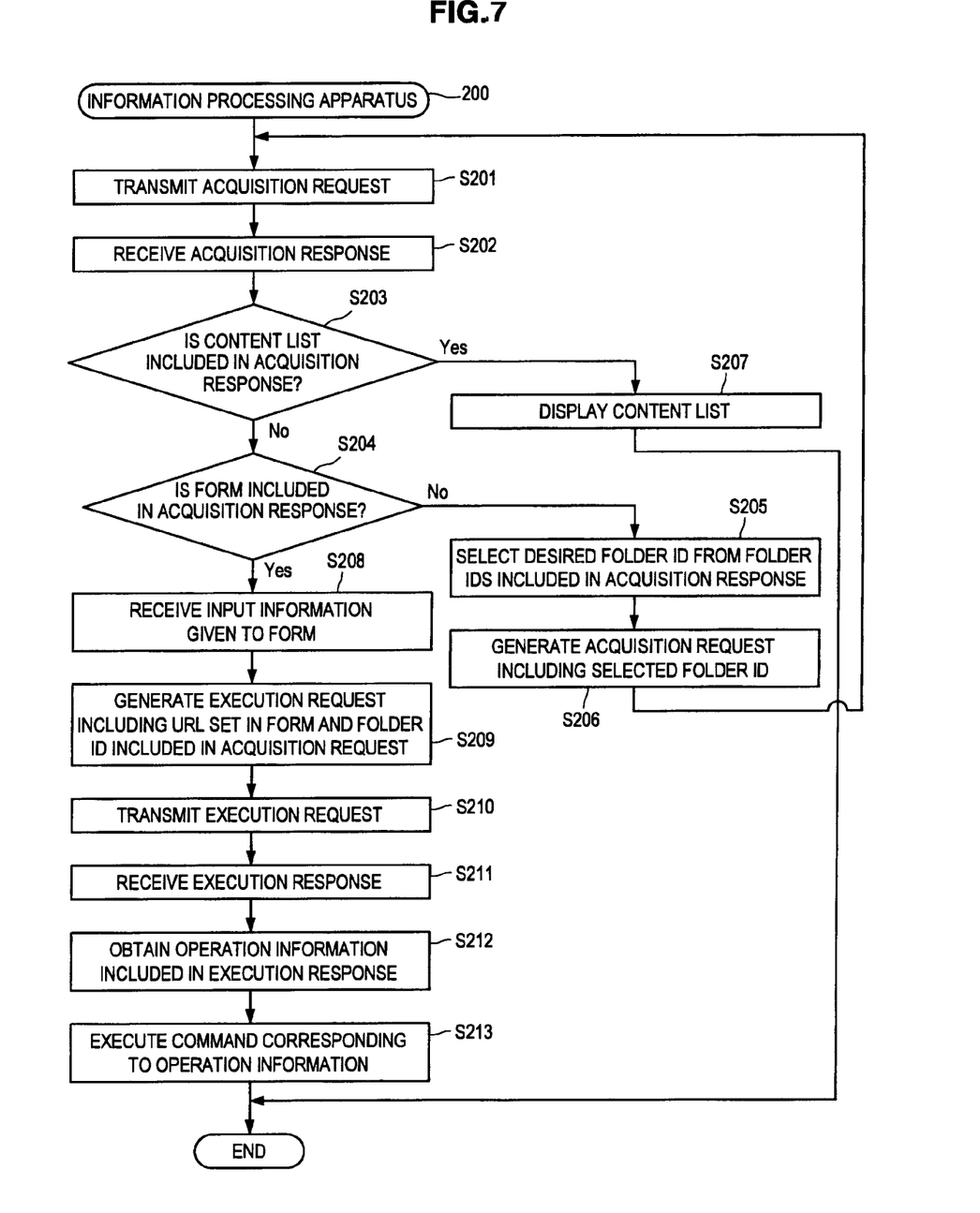
FIG. 7 is a flowchart illustrating a flowchart illustrating a flow of processing executed by the information processing apparatus according to the present embodiment.

FIG. 7 is a flowchart illustrating a flowchart illustrating a flow of processing executed by the information processing apparatus according to the present embodiment. The flowchart as shown in FIG. 7 shows an example of processing executed by the information processing apparatus 200. However, the processing executed by information processing apparatus 200 is not limited to the processing as shown in this flowchart.

First, the transmission unit 260 of the information processing apparatus 200 transmits the acquisition request including the folder ID to the information providing apparatus 100 (step S201). The reception unit 270 receives an acquisition response, i.e., a response to the acquisition request (step S202), and step S203 is subsequently performed. When the acquisition response includes a content list ("Yes" in step S203), the display unit 280 displays the content list (step S207), and processing is terminated.

When the acquisition response does not include a content list ("No" in step S203) and does not include a form ("No" in step S204), the input information determining unit 220 determines that the acquisition response includes a folder ID. Accordingly, the input information determining unit 220 selects a desired folder ID from folder IDs included in the acquisition response (step S205), and the acquisition request generation unit 231 generates an acquisition request including the folder ID selected by the input information determining unit 220 (step S206), and step S201 is subsequently performed again.

When the acquisition response does not include a content list ("No" in step S203) and includes a form ("Yes" in step S204), the input unit 210 receives input information given to the form (step S208), and the execution request generation unit 232 generates an execution request including a URL set in the form and the folder ID included in the acquisition request (step S209), and step S210 is subsequently performed.

Subsequently, the transmission unit 260 transmits the execution request generated by the execution request generation unit 232 to the information providing apparatus 100 (step S210). Subsequently, the reception unit 270 receives the execution response (step S211). The execution unit 243 obtains operation information included in the execution response (step S212), and executes a command corresponding to the operation information (step S213). Processing is terminated.

[1-8. Flow of Processing Executed by Information Processing System]

Figure 8:
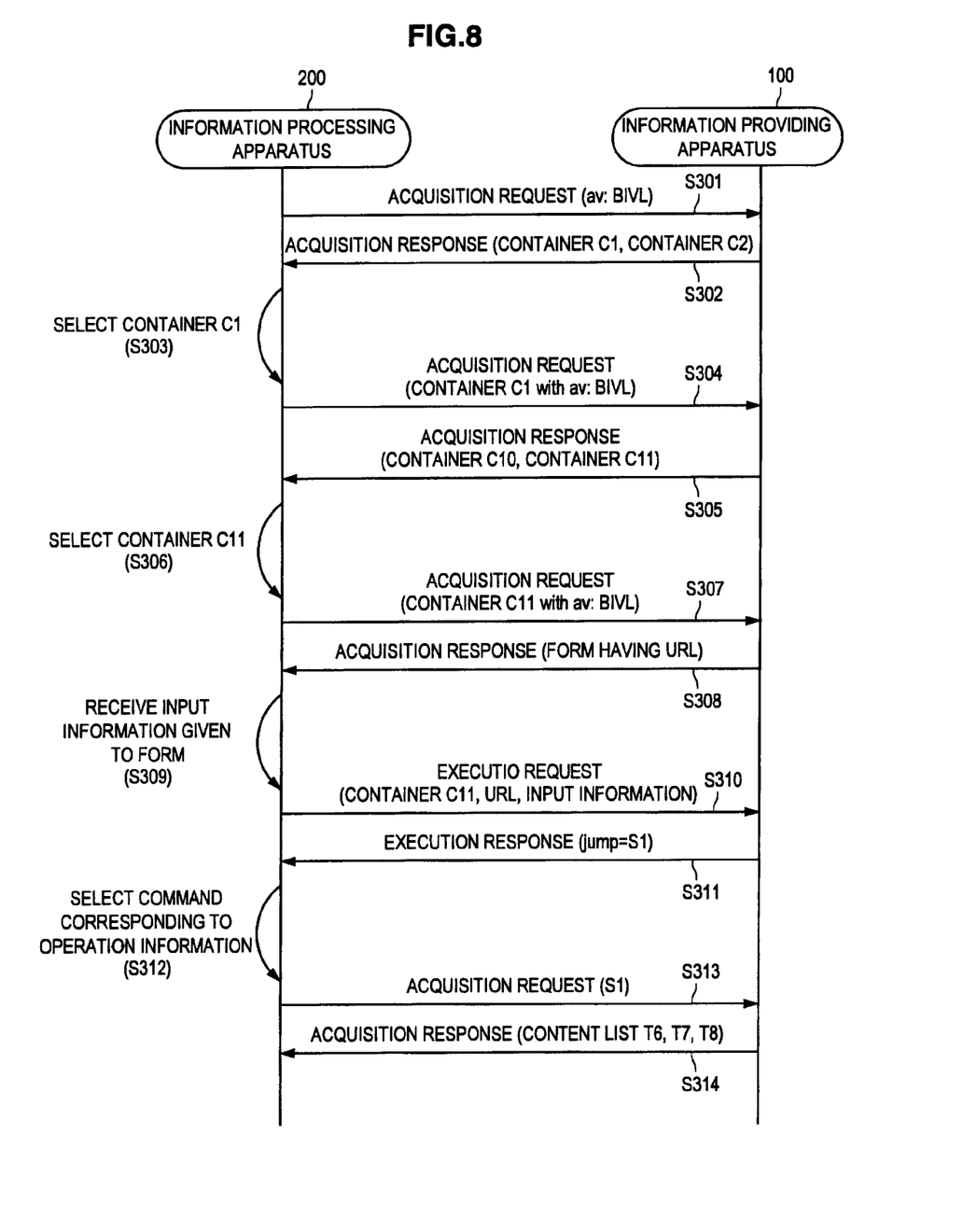
FIG. 8 is an example of a flowchart illustrating a flow of processing executed by the information processing system according to the present embodiment.

FIG. 8 is an example of a flowchart illustrating a flow of processing executed by the information processing system according to the present embodiment. The sequence diagram as shown in FIG. 8 shows an example of processing executed by the information processing system 10. However, the processing executed by the information processing system 10 is not limited to the processing as shown in this sequence diagram. FIG. 8 particularly shows the flow of processing executed by information processing system 10 in a case where the information processing apparatus 200 selects "ROOT", "container C1", and "container C11" as shown in FIG. 3 in this order.

The information processing apparatus 200 transmits an acquisition request including "av:BIVL" to the information providing apparatus 100 (step S301). The information providing apparatus 100 replies an acquisition response including the folder ID for identifying the container C1 and the folder ID for identifying the container C2 to the information processing apparatus 200 as a response to the acquisition request (step S302). The information processing apparatus 200 selects the container C1 (step S303), and transmits an acquisition request including "av:BIVL" and the folder ID for identifying the selected container C1 to the information providing apparatus 100 (step S304). The information providing apparatus 100 replies an acquisition response including the folder ID for identifying the container C10 and the folder ID for identifying the container C11 to the information processing apparatus 200 as a response to the acquisition request (step S305).

The information processing apparatus 200 selects the container C11 (step S306), and transmits an acquisition request including "av:BIVL" and the folder ID for identifying the selected container C11 to the information providing apparatus 100 (step S307). The information providing apparatus 100 replies an acquisition response including the form F1 having the URL to the information processing apparatus 200 as a response to the acquisition request (step S308).

The information processing apparatus 200 receives input information given to the form F1 (step S309), and transmits an execution request including input information, a URL set in the form F1, and the folder ID for identifying the container C1 included in the acquisition request, to the information providing apparatus 100 (step S310). The information providing apparatus 100 replies an execution response including operation information "jump" attached with the search text S1 to the information processing apparatus 200 as a response to the acquisition request (step S311).

The information processing apparatus 200 selects transmission of an acquisition request as a command corresponding to the operation information "jump" (step S312), and transmits an acquisition request including the search text S1 attached to the operation information to the information providing apparatus 100 (step S313). The information providing apparatus 100 generates a request including a content list (contents T6, T7, T8) obtained by searching the search text S1 included in the acquisition request received from the information processing apparatus 200, and replies the response including the content list (contents T6, T7, T8) as a request to the acquisition request to the information processing apparatus 200 (step S314).

2. MODIFICATION

It should be understood by those skilled in the art that various modifications, combinations, sub-combinations and alterations may occur depending on design requirements and other factors insofar as they are within the scope of the appended claims or the equivalents thereof.

3. CONCLUSION

According to the present embodiment, the state of the information processing apparatus 200 after execution of the form can be changed according to the state of the information processing apparatus 200 during execution of the form. According to the present embodiment, it is not necessary for the information processing apparatus 200 to particularly recognize the type of the form, and the form is executed based on input information, as long as the input information given to the form is transmitted to the information providing apparatus 100. This is because the information providing apparatus 100 can recognize, based on an acquisition request, a container viewed on the information processing apparatus 200, and the information providing apparatus 100 can identify the form executed by the information processing apparatus 200. Therefore, it is not necessary for the information processing apparatus 200 to implement functions corresponding to the types of the forms to be executed. As a result, the information processing apparatus 200 can execute any given form using an integrated function.

What is claimed is:

1. An information-providing apparatus for managing form data representing a form, the apparatus comprising:
   a communication unit configured to communicate with an information-processing apparatus over a network;
   a storage unit storing a container; and
   a processing unit configured to:
   receive, via the communication unit, a request to access the container from the information-processing apparatus;
   retrieve, from the container, form data representing a form;
   send, via the communication unit, the form data to the information-processing apparatus;
   receive, via the communication unit, a form execution request from the information-processing apparatus, the form execution request including:
   an identification of the container; and
   user-supplied information added to the form data; and
   execute the form execution request, based on the identification of the container and on the user-supplied information;
   wherein the information-providing apparatus comprises a Digital Media Server (DMS) in a Digital Living Network Alliance (DLNA) environment.

2. The information-providing apparatus of claim 1, wherein the information-processing apparatus comprises a Digital Media Player (DMP) in a Digital Living Network Alliance (DLNA) environment.

3. The information-providing apparatus of claim 1, wherein the processing unit is further configured to:
   determine whether the requested container contains the form data representing the form; and
   when it is determined that the container contains the form data, send, via the communication unit, the form data contained in the container to the information-processing apparatus.

4. The information-providing apparatus of claim 1, wherein the processing unit is further configured to:
   determine whether the requested container contains electronic content; and
   when it is determined that the container contains electronic content, send, via the communication unit, a list of the electronic content to the information-processing apparatus.

5. The information-providing apparatus of claim 1, wherein:
   the form execution request includes predetermined information included in the form; and
   the processing unit executes the form execution request, based on the predetermined information and on the user-supplied information added to the form.

6. The information-providing apparatus of claim 1, wherein the predetermined information included in the form comprises a Uniform Resource Locator (URL) identifying a resource for executing the form data.

7. The information-providing apparatus of claim 1, wherein:
   the storage unit further stores operation information in association with container identification information; and
   the processing unit is further configured to:
   obtain, from the storage unit, the operation information corresponding to the identified container; and
   execute the form execution request, based on the obtained operation information.

8. A computer-implemented method for managing form data representing a form, the method comprising:
   receiving, from an information-processing apparatus over a network, a request to access a container stored at an information-providing apparatus;
   retrieving, from the container, form data representing a form;
   sending the form data to the information-processing apparatus over the network;
   receiving, from the information-processing apparatus over the network, a form execution request comprising:
   an identification of the container; and
   user-supplied information added to the form data; and
   executing the form request, based on the identification of the container and on the user-supplied information;
   wherein the information-providing apparatus comprises a Digital Media Server (DMS) in a Digital Living Network Alliance (DLNA) environment.

9. A non-transitory computer-readable storage medium storing instructions which, when executed by an information-providing apparatus, cause the information-providing apparatus to perform a method for managing form data representing a form, the method comprising:
   receiving, from an information-processing apparatus over a network, a request to access a container stored at an information-providing apparatus;
   retrieving, from the container, form data representing a form;
   sending the form data to the information-processing apparatus over the network;
   receiving, from the information-processing apparatus over the network, a form execution request comprising:
   an identification of the container; and
   user-supplied information added to the form data; and
   executing the form request, based on the identification of the container and on the user-supplied information;
   wherein the information-providing apparatus comprises a Digital Media Server (DMS) in a Digital Living Network Alliance (DLNA) environment.

10. An information-processing apparatus for sending a form execution request, the information-processing apparatus comprising:
    a communication unit configured to communicate with an information-providing apparatus over a network;
    an input unit configured to receive input from a user of the information-processing apparatus; and
    a processing unit configured to:
    receive, via the input unit, user input indicative of a request to access a container stored at the information-providing apparatus;
    send, via the communication unit to the information-providing apparatus, the request to access the container;
    receive, via the communication unit from the information-providing apparatus, form data representing a form contained in the container;
    receive, via the input unit, user-supplied information added to the form data;
    send, via the communication unit to the information-providing apparatus, a form execution request including an identification of the container and the user-supplied information; and
    receive, via the communication unit, a result of executing the form execution request based on the identification of the container and on the user-supplied information;
    wherein the information-processing apparatus comprises a Digital Media Player (DMP) in a Digital Living Network Alliance (DLNA) environment.

11. A computer-implemented method for sending a form execution request, the method comprising:
    receiving, at an information-processing apparatus, input from a user indicative of a request to access a container stored at an information-providing apparatus;
    sending the request to access the container to the information-providing apparatus over a network;
    receiving, from the information-providing apparatus, form data representing a form contained in the container;
    receiving user-supplied information added to the form data;
    sending, to the information-providing apparatus, a form execution request including an identification of the container and the user-supplied information; and
    receiving a result of executing the form execution request based on the identification of the container and on the user-supplied information;
    wherein the information-processing apparatus comprises a Digital Media Player (DMP) in a Digital Living Network Alliance (DLNA) environment.

12. A non-transitory computer-readable storage medium storing instructions which, when executed by an information-processing apparatus, cause the information-processing apparatus to perform a method for sending a form execution request, the method comprising:
    receiving, at an information-processing apparatus, input from a user indicative of a request to access a container stored at an information-providing apparatus;

sending the request to access the container to the information-providing apparatus over a network;
receiving, from the information-providing apparatus, form data representing a form contained in the container;
receiving user-supplied information added to the form data;
sending, to the information-providing apparatus, a form execution request including an identification of the container and the user-supplied information; and
receiving a result of executing the form execution request based on the identification of the container and on the user-supplied information;
wherein the information-processing apparatus comprises a Digital Media Player (DMP) in a Digital Living Network Alliance (DLNA) environment.

* * * * *